(12) United States Patent
Beyda et al.

(10) Patent No.: US 6,980,569 B1
(45) Date of Patent: *Dec. 27, 2005

(54) APPARATUS AND METHOD FOR OPTIMIZING PACKET LENGTH IN TOL NETWORKS

(75) Inventors: William Joseph Beyda, Cupertino, CA (US); Shmuel Shaffer, Palo Alto, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/420,616

(22) Filed: Oct. 18, 1999

(51) Int. Cl.⁷ ............................................. H04J 3/06
(52) U.S. Cl. ................................................... 370/516
(58) Field of Search ................................ 370/503, 516, 370/517, 519, 352, 356; 375/371, 375; 711/167

(56) References Cited

U.S. PATENT DOCUMENTS

| | | | |
|---|---|---|---|
| 4,147,895 A | 4/1979 | Fenoglio | 179/15 |
| 4,771,391 A | 9/1988 | Blasbalg | |
| 5,146,477 A | 9/1992 | Cantoni et al. | 375/112 |
| 5,534,937 A | 7/1996 | Zhu et al. | 348/466 |
| 5,550,877 A | 8/1996 | Waters | 375/372 |
| 5,621,775 A | 4/1997 | Etienne | 375/372 |
| 5,623,483 A * | 4/1997 | Agrawal et al. | 370/253 |
| 5,640,388 A | 6/1997 | Woodhead et al. | 370/468 |
| 5,652,627 A | 7/1997 | Allen | 348/497 |
| 5,757,871 A | 5/1998 | Furukawa et al. | 375/372 |
| 5,764,298 A | 6/1998 | Morrison | 348/500 |
| 5,825,771 A * | 10/1998 | Cohen et al. | 370/394 |
| 5,881,245 A | 3/1999 | Thompson | |
| 5,940,479 A * | 8/1999 | Guy et al. | 370/410 |
| 6,259,677 B1 * | 7/2001 | Jain | 370/516 |
| 6,452,950 B1 * | 9/2002 | Ohlsson et al. | 370/516 |
| 6,683,889 B1 * | 1/2004 | Shaffer et al. | 370/516 |
| 6,747,999 B1 * | 6/2004 | Grosberg et al. | 370/516 |

FOREIGN PATENT DOCUMENTS

| | | | | |
|---|---|---|---|---|
| EP | 0921666 | * | 6/1999 | H04L 29/06 |
| GB | 2 311 703 | | 10/1997 | H04L 12/56 |
| WO | WO 95/22233 | * | 8/1995 | H04Q 11/04 |
| WO | WO 95/34977 | | 12/1995 | H04L 12/56 |
| WO | WO 96/15598 | * | 5/1996 | H04J 3/02 |

OTHER PUBLICATIONS

Report No. 45, A Technical Report on Speech Packetization, T1A1.7 Working Group, pp. 1-24, Dec. 1995.*
Stone et al, An Empirical Study of Delay Jitter Management Policies, University of North Carolina, pp. 1-20, Jul. 1994.*
DataBeam Corporation White Paper, A Primer on the H.323 Series Standard, pp. 1-17, May 15, 1998.*
Copy of Search Report for GB Appln. No. 0 023 825.3; date search was completed: Mar. 28, 2001.

* cited by examiner

Primary Examiner—Frank Duong

(57) ABSTRACT

A system and method for optimizing packet length in a telephony-over-LAN (ToL) network (101). A threshold of packet length as a fraction of jitter buffer size is established. When call setup is undertaken, endpoints such as client terminals (102A, 102B) check the packet sizes against the threshold. If the packet sizes are at or below the threshold, the packet sizes are adjusted upwards. If they are already above the threshold, the packet sizes are left alone. Optimizing packet length using this threshold minimizes the consumption of unnecessary processing power at the endpoints and switching entities, as well as unnecessary network traffic due to excess overhead, that would otherwise occur when the jitter buffers are longer than the packet sizes.

15 Claims, 5 Drawing Sheets

APPARATUS AND METHOD FOR OPTIMIZING PACKET LENGTH IN TOL NETWORKS

BACKGROUND OF THE INVENTION

1. Field of the Invention

The present invention relates to packet transmission and, particularly, to a system and method for accessing a jitter buffer.

2. Description of the Related Art

When sending voice data across packet networks, such as telephony-over-LAN (ToL) networks, the voice is usually compressed, packetized and finally sent across the network to the destination. When the packets are sent into the network, they are generated at a constant rate. However, due to behavior of the packet network, the even time intervals between the packets are lost as the packets transit the network. This irregularity in packet separation is referred to as "jitter." Jitter can cause clicks, delays and other annoyances in multimedia transmission, creating overall poor reproduction quality. A jitter buffer is often used to even out the packet separation. A jitter buffer is a FIFO (first in, first out) buffer in which packets leave the buffer at a predetermined, constant rate.

The length of the packets is typically minimized to reduce the delay induced by the packetization. The size of the jitter buffer, in contrast, is typically based on the expected network delay and as such, could be much higher than the size of a single packet. Jitter buffers that are much longer than the packet size result in unnecessary processing power consumption on the endpoints and intermediate switching entities, as well as unnecessary network traffic due to excess overhead.

Thus, conventional systems employing jitter buffers can disadvantageously mismatch the size of the jitter buffer and the length of data packets, resulting in decreased network performance.

SUMMARY OF THE INVENTION

These and other drawbacks in the prior art are overcome in large part by a system and method for optimizing packet length in telephony-over-LAN networks. According to one embodiment, a threshold of packet length as a fraction of jitter buffer size is established. When call setup is undertaken, client terminals check the packet sizes against the threshold. If the packets sizes are at or below the threshold, the packet sizes are adjusted upwards. If the packet sizes are already above the threshold, the packet sizes are left alone.

A telecommunications client terminal according to the present invention includes a jitter buffer controller for adjusting packet size. During a terminal capability exchange, the client terminal identifies a proposed packet size with another terminal. The jitter buffer controller compares the packet size with the threshold value and, if necessary, adjusts the packet size.

Thus, the present invention allows for relatively less processing power consumption on the endpoints and intermediate switching entities, and decreases unnecessary network traffic due to excess overhead.

BRIEF DESCRIPTION OF THE DRAWINGS

A better understanding of the invention is obtained when the following detailed description is considered in conjunction with the following drawings in which.

DETAILED DESCRIPTION OF THE INVENTION

FIGS. 1–6 illustrate a system and method for optimizing packet length in telephony-over-LAN (ToL) networks. According to an embodiment of the invention, a ToL connection is established using H.323 call setup techniques, with corresponding jitter buffers set according to predetermined criteria. The default packet size is compared with the jitter buffer size and a pre-configured threshold. If the packet size is less than this threshold, the packet size is raised to it.

Figure 1:
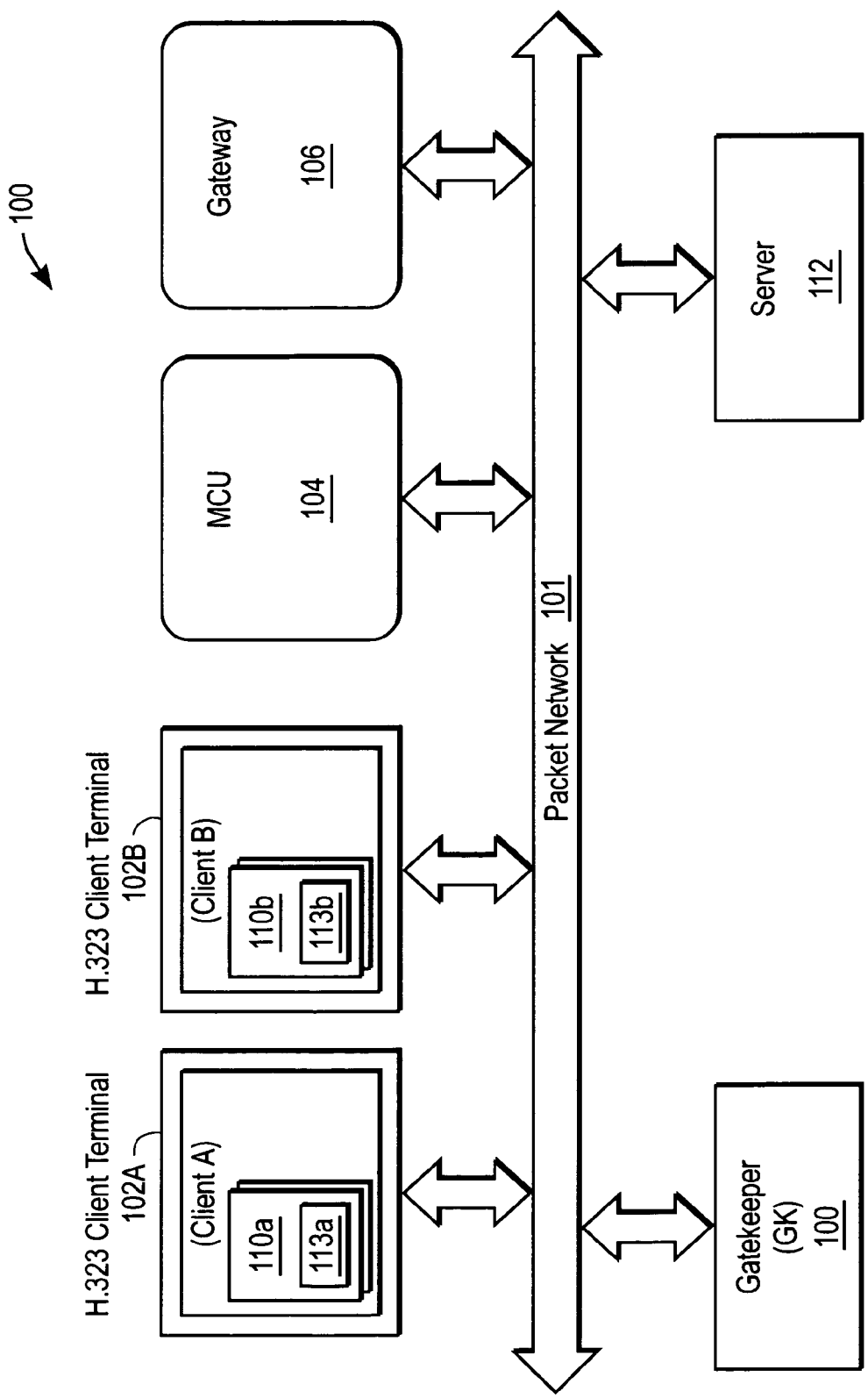
FIG. 1 is a block diagram of an exemplary telephony-over-LAN (ToL) network according to an embodiment of the invention.

Turning now to FIG. 1, an exemplary telecommunications system 100 according to an embodiment of the invention is shown therein and identified by the reference numeral 100. The telecommunications system 100 includes a local area network (LAN) or packet network 101. Coupled to the LAN 101 may be a variety of H.323 terminals 102a, 102b, a multi-point control unit (MCU) 104, an H.323 gateway 106, an H.323 gatekeeper 108, a LAN server 112, and a plurality of other devices such as personal computers (not shown).

The H.323 terminals 102a, 102b are in compliance with the H.323 Recommendation. Thus, the H.323 terminals 102a, 102b support H.245 control signaling for negotiation of media channel usage, Q.931 (H.225.0) for call signaling and call setup, H.225.0 Registration, Admission, and Status (RAS), and RTP/RTCP for sequencing audio and video packets. The H.323 terminals 102a, 102b may further implement audio and video codecs, T.120 data conferencing protocols and MCU capabilities. Further details concerning the H.323 Recommendation may be obtained from the International Telecommunications Union; the H.323 Recommendation is hereby incorporated by reference in its entirety as if fully set forth herein.

Further, the H.323 terminals 102a, 102b include jitter buffers 113a, 113b and jitter buffer controls 110a, 110b according to the present invention. As will be described in greater detail below, the jitter buffer controls 110a, 110b function to identify jitter buffer size and packet size. If the packet size is lower than a predetermined threshold (typically, a fraction of the jitter buffer size), the packet size is increased. That is, the data are packetized according to the adjusted size.

Figure 2:
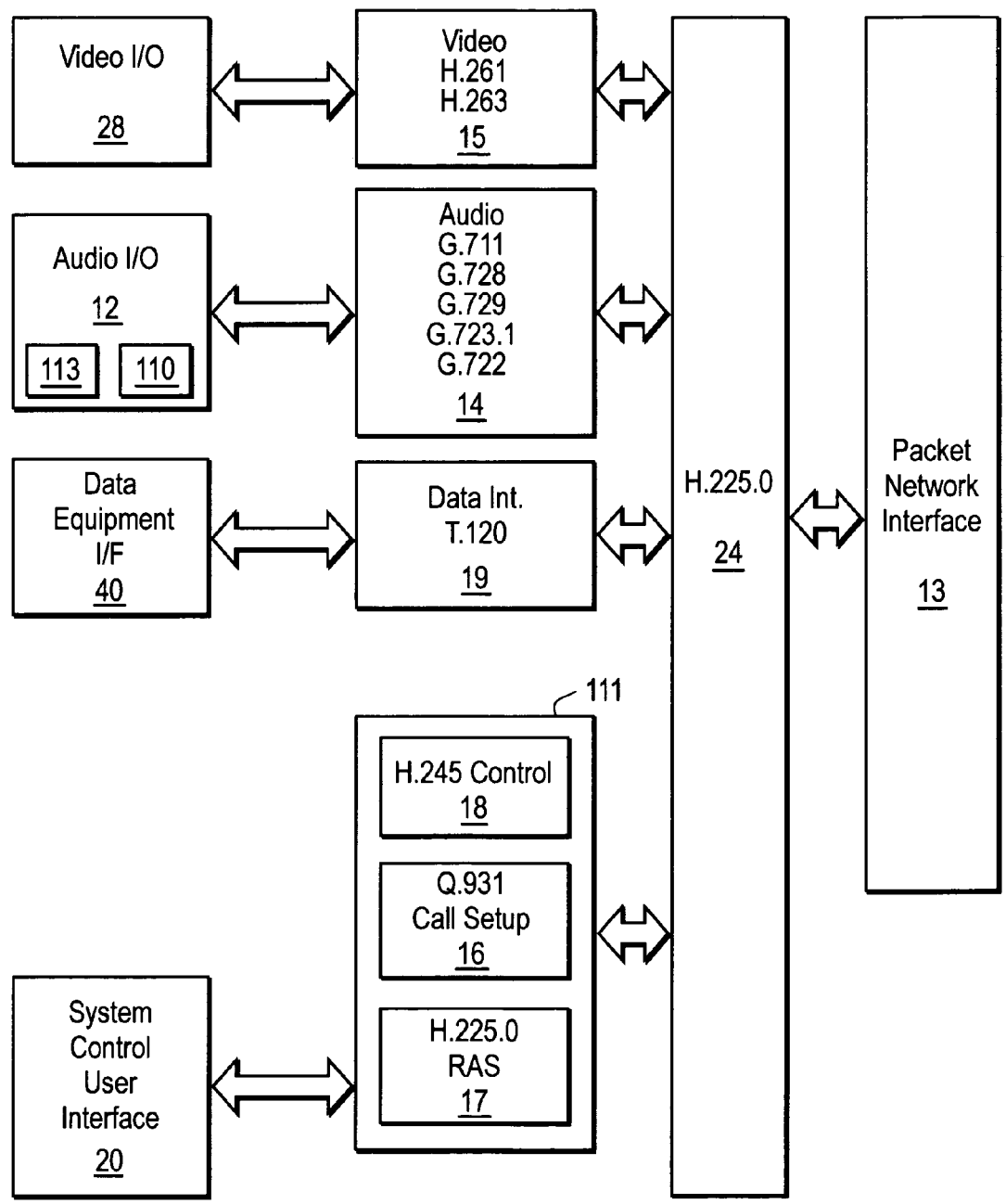
FIG. 2 is a logic diagram of an exemplary telephony-over-LAN (ToL) client according to an embodiment of the invention.

In accordance with a specific embodiment, FIG. 2 illustrates a logical diagram of an H.323 interface to the LAN 101. The H.323 interface of a network terminal/device 102 includes a jitter buffer control 110 according to the present invention and a packet network interface 13 that is coupled to the network terminal 102. As will be discussed in greater detail below, the network terminal 102 utilizes the ITU-T H.323 Recommendation protocol in specific embodiments. The network interface 13 couples the network terminal 102 to the LAN 101. The network can include packet-switched Transmission Control Protocol/Internet Protocol (TCP/IP) and Internet Packet Exchange (IPX) over Ethernet, Fast Ethernet and Token Ring networks.

The H.323 terminal 102 is coupled to a video input/output (I/O) interface 28, an audio I/O interface 12, a data equipment interface 40, and a system control user interface (SCUI) 20. A jitter buffer 113 and jitter buffer control 110 may be formed in association with the audio I/O 12. A jitter buffer control may similarly be associated with the video I/O 28, but is omitted for convenience. Thus, the figures are exemplary only. The jitter buffer control layer 110 functions to determine and adjust a packet size to more optimally correspond to the size of a jitter buffer 113. The actual packetization occurs within the codec in response to the jitter buffer control command.

The network terminal 102 further includes an H.225.0 layer 24, an audio coder/decoder (codec) 14 and may include, a video codec 15, and a T.120 data interface layer 19. The audio I/O interface or card 12, which may be part of the standard H.323 device, connects to the audio codec 14, such as a G.711 codec, for encoding and decoding audio signals. The audio codec 14 is coupled to the H.225.0 layer 24. It encodes audio signals for transmission and decodes the received signals. Although the G.711 codec is the mandatory audio codec for an H.323 terminal, other audio codecs, such as G.728, G.729, G.723.1, G.722, and MPEG1 audio may also be used for encoding and decoding speech. G.723.1 is a preferred codec because of its reasonably low bit rate, which enables preservation of link bandwidth, particularly in slower speed network connections.

The video I/O interface or card 28, which may be part of the standard H.323 device, connects to a video codec 15, such as an H.261 codec for encoding and decoding video signals. The video codec 15 encodes video signals for transmission and decodes the received signals. H.261 is the mandatory codec for H.323 terminals that support video, though other codecs such as H.263 may be supported.

The system control user interface (SCUI) 20 provides signaling and flow control for proper operation of the H.323 terminal 102. In particular, call signaling and control are handled via the SCUI 20 and, particularly, the control layer 111. The control layer 111 also includes a Q.931 layer 16, an H.225.0 RAS layer 17 and an H.245 layer 18. Thus, the SCUI 20 interfaces to the H.245 layer 18 which is the media control protocol that allows capability exchange, opening and closing of logical channels, mode preference requests, flow control messages, and other miscellaneous commands and indications. The SCUI 20 also interfaces to the Q.931 protocol 16, which defines the setup, teardown, and control of H.323 communication sessions. The SCUI 20 further interfaces to the H.225.0 Registration, Admission and Status (RAS) protocol that defines how H.323 entities can access H.323 gatekeepers to perform, among other things, address translation, thereby allowing H.323 endpoints to locate other H.323 endpoints via an H.323 gatekeeper. The H.225.0 layer 24, which is derived from the Q.931 layer 16 is the protocol for establishing a connection among two or more terminals and also formats the transmitted video, audio, data, signaling, and control streams into messages for communication via the network interface 13 (e.g., packet network 101). The H.225.0 layer 24 also retrieves the received video, audio, data, signaling and control streams from messages that have been input from the network interface, routes the signaling and control information to the control layer 111 and routes media streams to the appropriate audio, video and data interfaces.

Thus, an H.323 network may be configured to include several different devices. For example, the network may include a terminal for enabling a user connected to a LAN to communicate with another user on the LAN, a terminal for enabling a caller resident on the LAN to call a second party in the public switched network and/or a terminal for enabling an adapter to communicate through a wireless trunk, using a wireless telephone. The device may also implement supplementary services according to the H.450.X Recommendations.

Figure 3:
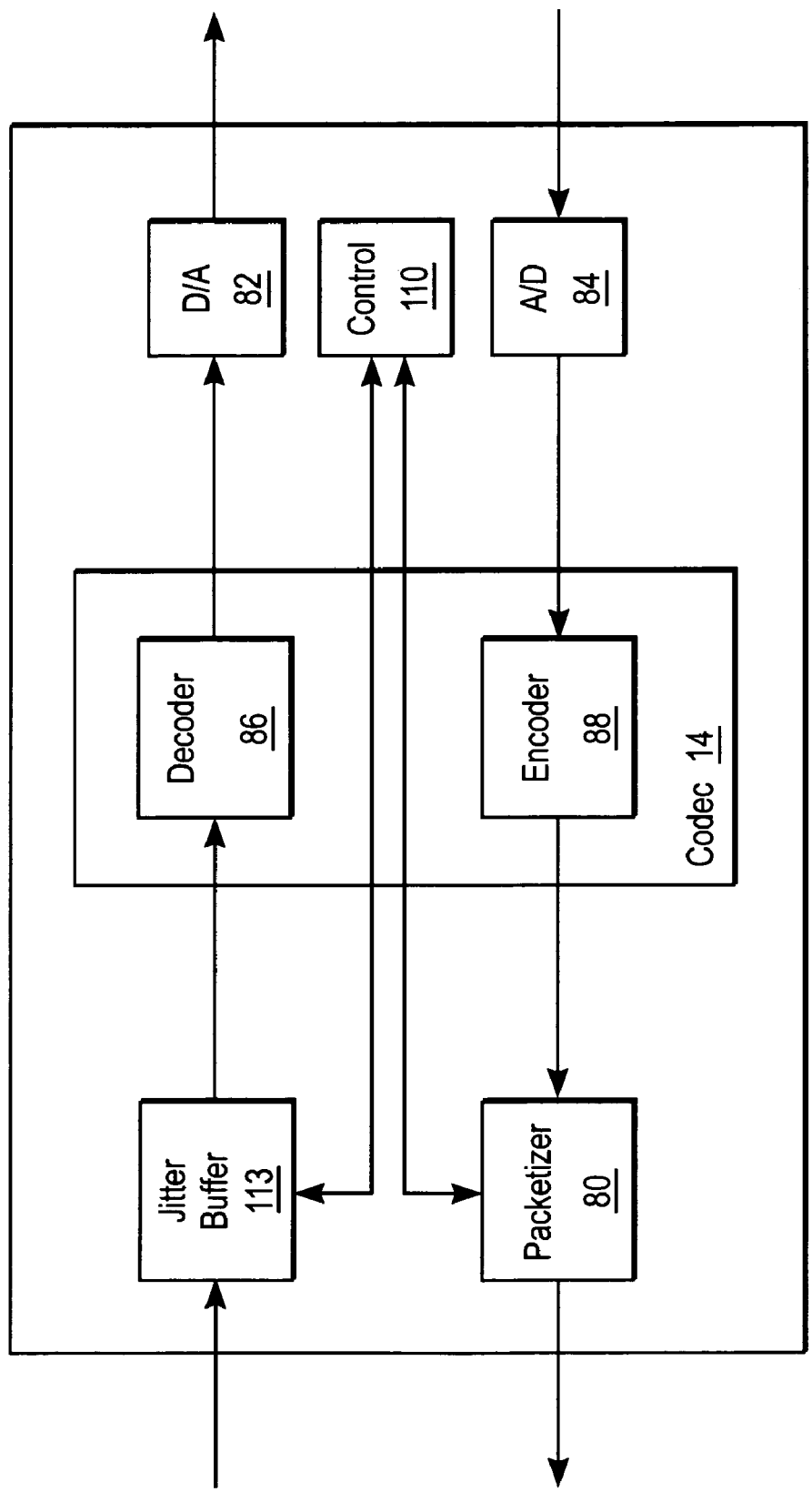
FIG. 3 is a block diagram of an exemplary codec and audio I/O interface according to an embodiment of the present invention.

An exemplary audio I/O and audio codec according to an embodiment of the present invention is shown in FIG. 3. A codec 14 includes an encoder 88 for encoding audio data and a decoder 96 for decoding incoming audio data. The decoder 86 is coupled to a digital-to-analog converter 82. Similarly, the encoder 88 is coupled to an analog-to-digital converter 84. A jitter buffer 113 is provided at the input to the decoder 86. A packetizer 80 is provided at the output of the encoder 88. The packetizer 80 formats outgoing audio data into data packets for transmission over the data network. A controller 110, which may be embodied as a known microcontroller, controls operation of the jitter buffer 113 and the packetizer 80. As will be explained in greater detail below, the controller 110 monitors a size of the jitter buffer 113 and the size of data packets being packetized in the packetizer 80. If the packet size is less than a predetermined threshold related to jitter buffer size, then the packet size is increased to the threshold level. If the two endpoints have different sized jitter buffers, then the packet size may be set to the greater of the two, i.e., to maximize jitter buffer filling.

Figure 4:
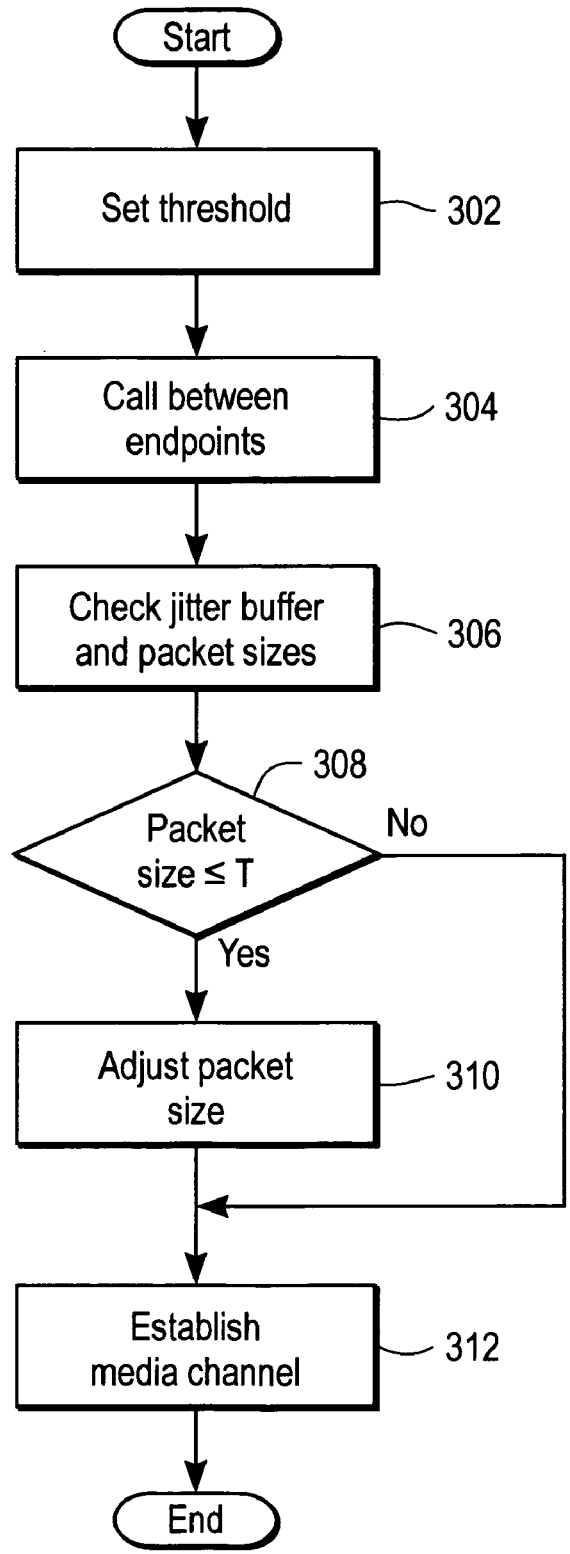
FIG. 4 is a flowchart illustrating operation of an embodiment of the invention.

Turning now to FIG. 4, a flowchart illustrating operation of an embodiment of the invention is shown. In a step 302, a threshold is set by the jitter buffer control unit 110. The threshold may be, for example, a percentage of the jitter buffer size. The threshold may be set, for example, by a system administrator. Next, in a step 304, one or more H.323 endpoints 102a, 102b seek to establish a call. As such, they undertake standard H.323 call set up and signaling exchanges, for example, via the gatekeeper 108. In a step 306, the H.323 endpoints 102a, 102b and, particularly, the jitter buffer controllers 110a, 110b check their jitter buffer sizes and compare the packet sizes with the threshold, in a step 308.

If the packet size in either endpoint is greater than the threshold, then the call is established, in a step 312. However, if the packet size is less than or equal to the threshold, then the packet size is increased to the threshold, in a step 310. As noted above, a common packet size is established. The media streams are then established using the new packet sizes, in step 312.

Figure 5:
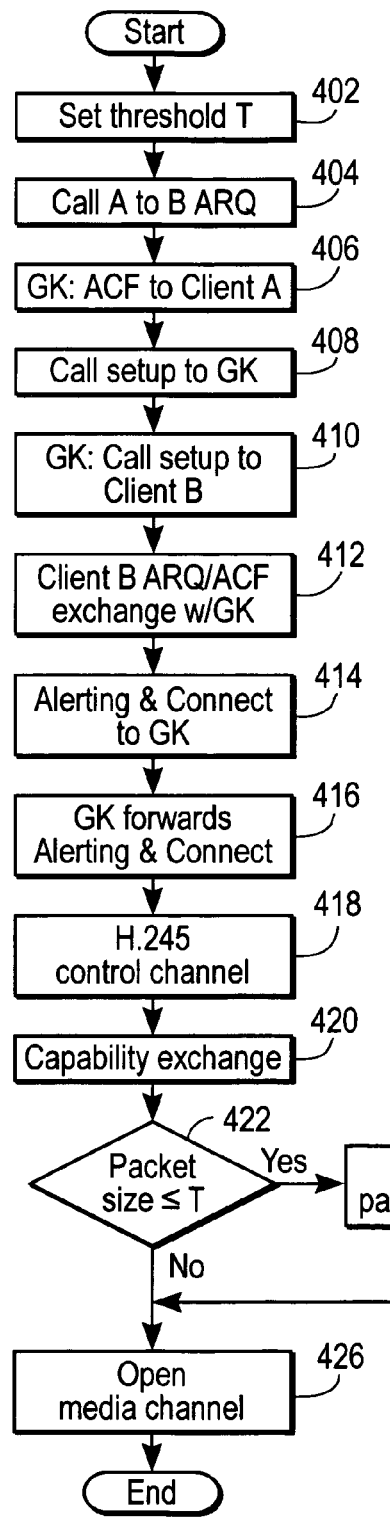
FIG. 5 is a flowchart illustrating operation of an embodiment of the invention.

Operation of a specific implementation of the invention is shown in greater detail in FIG. 5. In particular, FIG. 5 illustrates operation of the invention in a scheme employing gatekeeper-routed call signaling and setup. In a step 402, the packet size threshold (T) is set. In a step 404, an endpoint Client A, such as the H.323 Client Terminal 102a (FIG. 1), wants to establish a call to another endpoint, Client B, such as H.323 Client Terminal 102b. The endpoint Client A and, particularly, the control unit 111a, sends an ARQ message (AdmissionRequest) to the gatekeeper GK. The gatekeeper GK responds with an ACF (AdmissionConfirm) message to Client A, in a step 406, which is received by the control unit 111a. In a step 408, in response to the ACF message, the control unit 111a sends an H.225.0 Set-up message to the gatekeeper GK.

In a step 410, the gatekeeper GK relays the H.225.0 Setup message to the endpoint Client B and, in particular, its control unit 111b. In a step 412, the endpoint Client B's control unit 111b conducts an ARQ/ACF exchange with the gatekeeper GK. In a step 414, the endpoint Client B's control unit 111b sends H.225.0 Alerting and Connect messages to the gatekeeper GK as the call progresses to the connect state. The gatekeeper GK, in turn provides the Alerting and Connect messages to the endpoint Client A's control unit 111a in a step 416. The Alerting or Connect message includes the Gatekeeper H.245 Control Channel Transport Address, which is used, in a step 418, to establish the H.245 control channel. Next, an H.245 capability exchange is undertaken, in a step 420. The capability exchange includes an exchange of packet size which is to be used for the communications. Typically, an initial default is sent. The Clients A and B, and particularly, the controllers 110a, 110b then check their jitter buffer sizes, in a step 422. If the packet size is less than or equal to the threshold T, the packet size in the packetizer 80 is adjusted, in a step 424, and the media channel is opened in step 426. If the packet size was already above the threshold, then the media channel is established directly. If the terminals have different sized buffers and, hence, different threshold T, then the packet size is set to a compatible size.

Figure 6:
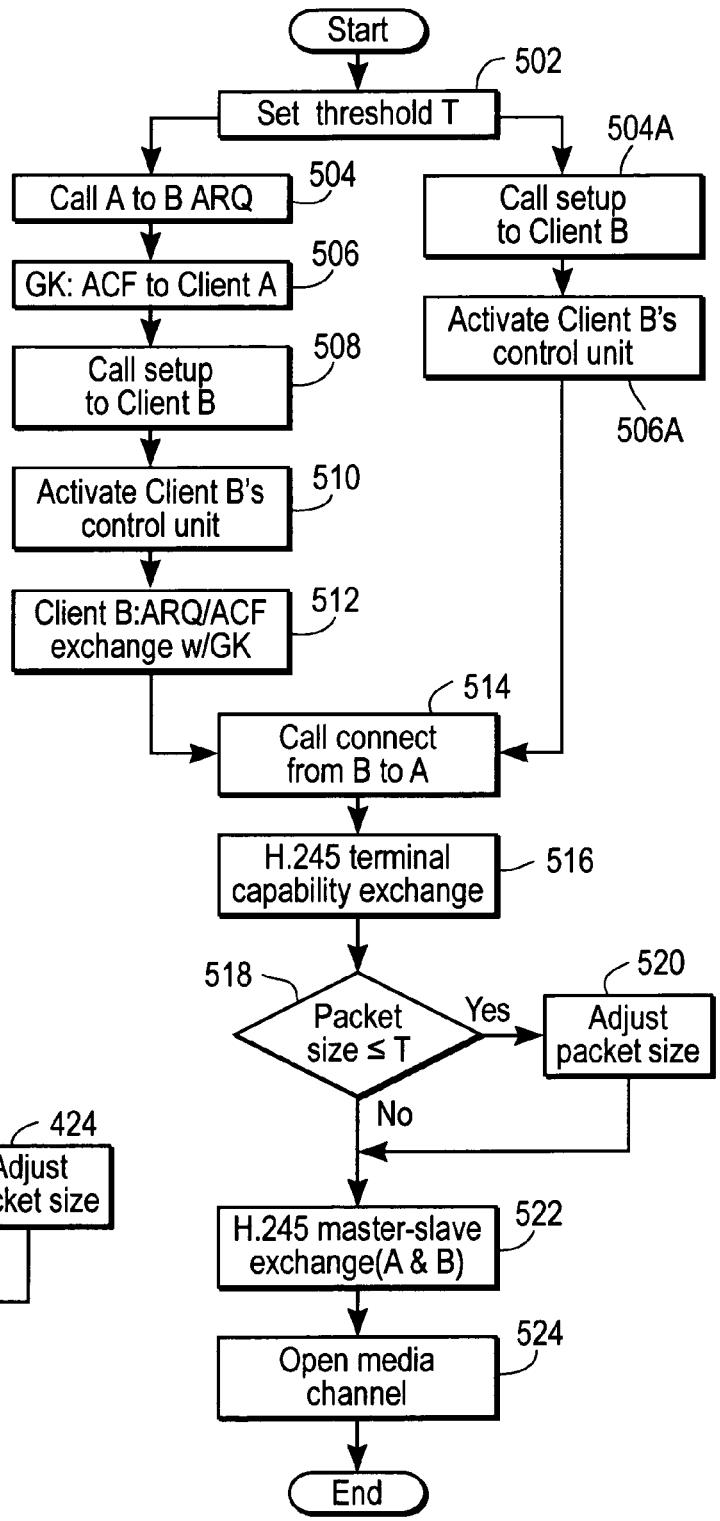
FIG. 6 is a flowchart illustrating operation of an embodiment of the invention.

An alternate implementation of the invention, employing H.323 direct (i.e., non-gatekeeper-routed) signaling is shown in FIG. 6. In a step 502, the control layer 111a and, particularly, the jitter buffer control 111a receives the threshold T. In a step 504, the control layer 11a of Client A sends an ARQ message to the gatekeeper GK requesting that a call to endpoint Client B be allowed using a direct call model. In a step 506, the gatekeeper GK responds with an ACF message to the endpoint Client A, which is received by the control layer 111a. The ACF message includes a Call Signaling Transport Channel Address of the endpoint Client B. In a step 508, in response to the ACF message, the control layer 111a sends an H.225.0 Setup message directly to endpoint Client B. In a step 510, the endpoint Client B receives the H.225.0 setup message and begins to process the received H.225.0 Setup message. In response to the setup message, in a step 512, the endpoint Client B's control layer 111b conducts an ARQ/ACF exchange with the gatekeeper GK. Next, in a step 514, the endpoint Client B's control layer 1111b sends an H.225.0 Connect message to the endpoint Client A's control layer 111a to progress the call to a connect state. In a step 516, the endpoint Clients 1 and 2 exchange H.245 terminal capability messages, including packet sizes. In a step 518, the jitter buffer controls 110a, 110b determine whether the packet sizes are less than or equal to the threshold. If so, then in a step 520, the packet sizes are adjusted to a common size, as discussed above. In a step 522, the endpoints Client A and Client B exchange H.245 master-slave determination messages and any other needed H.245 messages, such as negotiation of a common packet size if that has not already been established. In a step 524, both endpoints Client A and Client B establish a media channel. If, in step 518, the packet size was greater than the threshold T, the system proceeds directly to steps 522 and 524.

In another embodiment, the exchange of ARQ/ACF messages may be omitted after step 502. That is, a direct call may be established between the control units 111a and 111b with no involvement of gatekeeper GK. In this scenario, steps 504, 506, and 512 are omitted. That is, after step 502, in a step 504A, the control layer 111a sends an H.225.0 message directly to the endpoint Client B. In a step 506A, the endpoint Client 2 receives the H.225.0 Setup message and begins to process the received H.225.0 Setup message. Next, steps 514–524 as described above are followed.

What is claimed is:

1. A telecommunications node, comprising:
a jitter buffer;
means for receiving one or more information packets, said receiving means including means for storing said one or more information packets in said jitter buffer; and
means for increasing a length of said one or more information packets for input to said jitter buffer based on a threshold size of said jitter buffer.

2. A telecommunications node according to claim 1, said increasing means including means for increasing said length to a predetermined fraction of said size of said jitter buffer.

3. A telecommunications node according to claim 2, including means for monitoring a size of said jitter buffer during a communication.

4. A telecommunications node according to claim 3, said increasing means including means responsive to said monitoring means for adjusting said length to a new size of said jitter buffer during said communication.

5. A telecommunications method, comprising:
receiving one or more information packets, said receiving including storing said one or more information packets in a jitter buffer; and
increasing a length of said one or more information packets for input to said jitter buffer based on a threshold size of said jitter buffer.

6. A telecommunications method according to claim 5, said increasing including increasing said length to a predetermined fraction of said size of said jitter buffer.

7. A telecommunications method according to claim 6, including monitoring a size of said jitter buffer during a communication.

8. A telecommunications method according to claim 7, said increasing including increasing said length to a new size of said jitter buffer during said communication.

9. A telecommunications system, comprising:
a packet network;
a plurality of endpoints coupled to said packet network, each of said plurality of endpoints including a jitter buffer;
wherein each of said plurality of endpoints includes a jitter buffer controller configured to adjust a packet size of packets being input to said jitter buffer for communication over said packet network by comparing a packet size to a predetermined threshold value, said predetermined threshold value related to a jitter buffer size, and increasing said packet size if said packet size is less than said threshold.

10. A telecommunications system according to claim 9, wherein said jitter buffer controller is configured to compare a proposed packet size with a threshold value, said threshold value representative of a fraction of said jitter buffer size.

11. A telecommunications system according to claim 10, wherein said jitter buffer controller compares said proposed packet size responsive to an H.323 terminal capability exchange.

12. A telecommunication system according to claim 11, wherein said jitter buffer controller is configured to monitor a size of a jitter buffer during a communication and adjust a packet to a new size during a communication.

13. A telecommunication system according to claim 9, wherein said endpoints comprise client terminals.

14. A telecommunication device, comprising:
a codec;
a jitter buffer coupled to an input of the codec;

a packetizer coupled to an output of the codec; and a controller coupled to the codec, the jitter buffer, and the packetizer, wherein the controller is configured to cause the packetizer to increase a packet size if said packet size is related to a jitter buffer size according to predetermined criteria, such that packets received at said jitter buffer are of a new size wherein the predetermined criteria is a threshold fraction of the jitter buffer size.

15. A method for use in a telecommunications device, comprising:

setting a jitter buffer size threshold;

checking a packet size against said threshold when establishing a call to another telecommunications device;

increasing said packet size if said packet size is related to said jitter buffer size threshold according to predetermined criteria; and transmitting packets to said another telecommunications device at an adjusted packet size.

\* \* \* \* \*